United States Patent Office 3,426,560
Patented Feb. 11, 1969

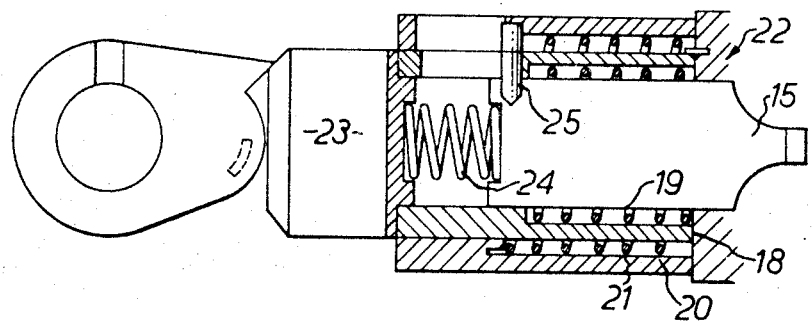
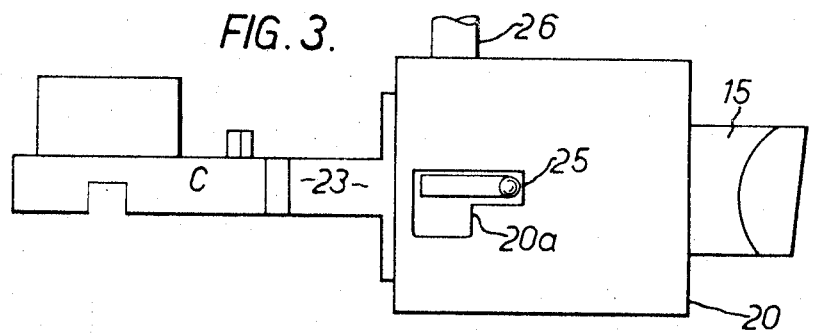
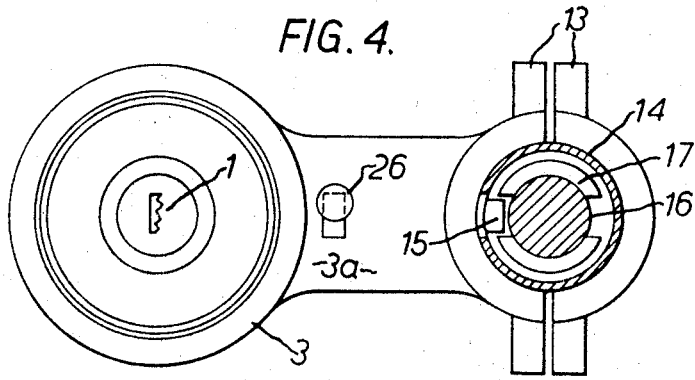

3,426,560
DEVICE FOR IMMOBILIZING
MOTOR VEHICLES
Arthur Stanley Dwan, 23 Grenaby Road,
Croydon, England
Filed July 19, 1966, Ser. No. 566,434
U.S. Cl. 70—252
Int. Cl. B60r 25/04, 25/02; H01h 27/06
9 Claims

ABSTRACT OF THE DISCLOSURE

An anti-theft lock for road vehicles in which the lock barrel of a standard form of tumbler lock is upset by being moved inwardly of its housing if forcing or picking is attempted, this upsetting breaking the electrical circuits and resulting in the lock barrel being rotatable and capable of re-setting only by the correct key. A mechanical steering column lock is also provided controlled by the lock key, and by which the steering can be locked only when the key is in the off position.

---

This invention relates to a device for immobilizing automobiles and other motor road vehicles. An object of the invention is to provide a device which enables a vehicle to be left locked and unattended and substantially secure against theft by driving away, in that, for example, appropriate electrical circuits are left broken and the steering is locked and in which any attempt to start the vehicle by the use of force on the locking device is ineffective. Another object of the invention is to provide a lock for immobilizing an automobile which operates on the steering to lock same, the arrangement being such that the steering locking cannot be applied solely by the action of switching off the engine.

A further object of the invention is to provide a lock which, when set for immobilization, opens electric contacts in the electric circuits of the vehicle and also can lock the steering of the automobile, but in which the automobile cannot be started with the steering locked. Yet another object is to provide a lock in which the steering cannot be locked whilst the automobile is moving.

The lock mechanism used is of a standard tumbler or pin form, which is turned by a conventional type of automobile key.

A further object of the invention is to provide a lock and immobilizing device for automobiles which is easily fitted, which isolates the electric circuits when in the "off" position, and which also can lock the steering only after key removal.

Thus, the invention provides a means permitting the starting up of the vehicle only when the correct key is used, attempted forcing or use of the wrong key upsetting the lock, for re-setting only by the correct key.

In order that a clear understanding of the invention may be obtained, reference will now be made to the accompanying drawings, showing by way of example, a preferred form of the invention. In the drawings:

FIGURE 2 is a fragmentary view, partly in section, showing the operating cam and steering locking means looking from the right of FIGURE 1, FIGURE 3 is a fragmentary view in the same direction as FIGURE 1, showing the cam and locking means, and FIGURE 4 is a general view from above showing the device attached to a steering column of a road vehicle.

Figure 1:
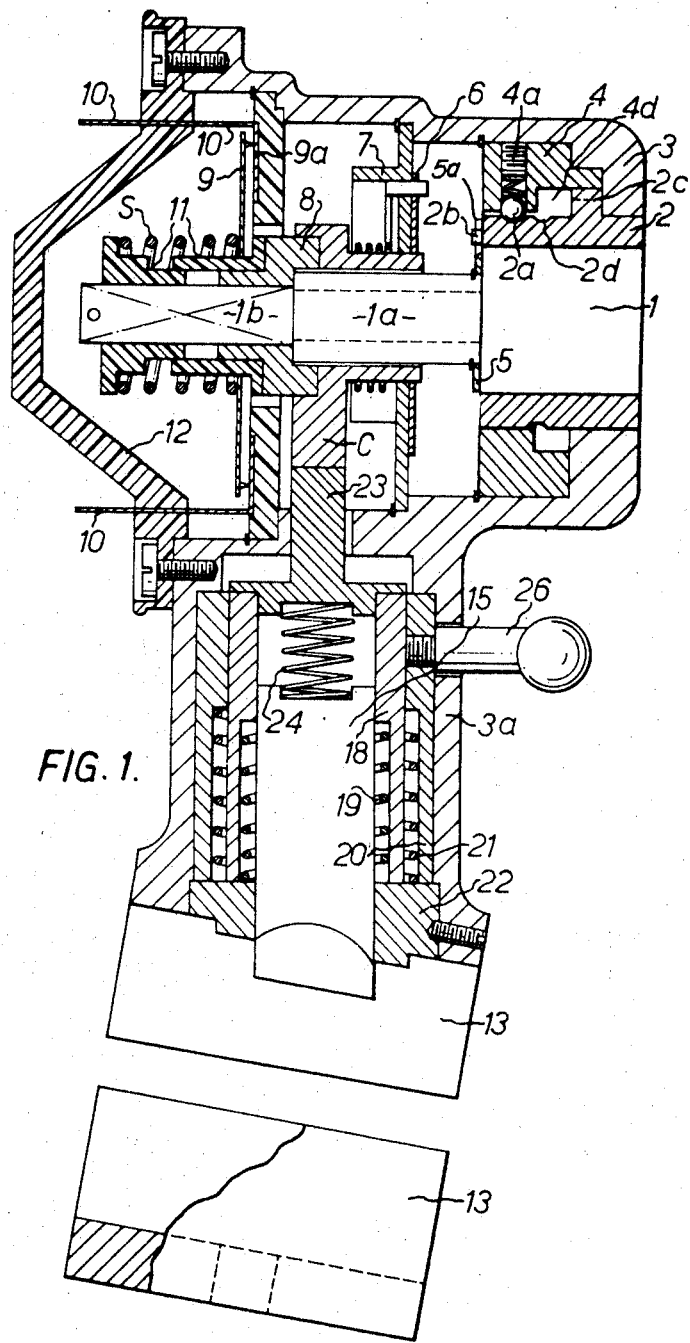
FIGURE 1 is a horizontal cross-section through the device.

As seen in FIGURE 1, the device has a cylinder at its front end lock with a barrel 1 with an axial spindle extension 1a. The barrel is mounted in an inner sleeve 2, which is mounted in a body or housing 3 and also in an outer sleeve 4, this latter being secured in the body 3 against both rotary and axial movement. In the normal position (i.e. when not upset by attempted forcing) the inner sleeve 2 is held against rotation by a tongue 2c which engages a keyway in the outer sleeve 4.

The lock is of standard tumbler form and when the key is in the "off" position and the key withdrawn, the tumblers move out of the barrel into a slot or the like of the sleeve 2.

The outer sleeve 4 has a spring loaded ball catch 4a, which, in the normal position, engages in a recess 2a in the sleeve 2.

An indexing or locating plate 5 is mounted on the extension 1a adjacent the barrel 1 at which location the extension is of part-circular cross-section, the plate 5 having a corresponding hole therethrough so that said plate 5 turns and moves axially with the extension 1a. This plate 5 has a lug or flange 5a extending from part of its circumference forming a pair of spaced apart abutments and the sleeve 2 has a projection 2b riding on the circumference of the plate 5 but in the path of the abutments.

A square-section extension 1b follows the extension 1a. A housing 7 is held in the body or housing 3 by a recess and "circlip," this housing being for a cam C which is free to move around the extension 1a, but is secured to a contact detent plate 6. A cam dog 8 is located on the extension 1b, this dog being received in a recess in the cam C. The cam and dog have complementary teeth and recesses which engage only in one relative position. A moving contact plate 9 is provided. This plate has arms adapted to co-operate with fixed contacts such as 9a on an insulating plate, the contacts having outlet leads 10. The contact plate 9 is mounted on an insulated sleeve assembly 11, and the plate 9 and cam dog 8 are urged towards the cam by the spring S. The contacts 9a are segmental, of a length and located so as to provide the necessary make and break determined by the positions of the key and lock. The contacts can, for example, comprise a battery common feed contact, this being connected by the arms to other fixed contacts to the ignition, auxiliary circuits and starter motor relay. An alarm contact could be provided to operate an alarm on any attempt to force the lock.

The body or housing 3 is closed by a cover plate 12, and also has a lateral cylindrical extension 3a terminating in the one part of a yoke 13, the other part of the yoke enabling the housing to be mounted on the steering column outer casing 14 of a vehicle (FIGURE 4). The device is provided with a bolt 15, this being mounted to slide axially to engage in a slot in the steering shaft 16, which slot can be formed in any suitable way, as shown by means of a split collar 17. The operation of the bolt will be described later.

The lock is operated by means of a correct key, and the arrangement provides on/off ignition with a non-locking overthrow contact for engine starting. The lock is arranged to give an intermediate position in which the engine is switched off and the key can be removed for normal parking without locking the steering. All key positions are given a positive click location by means of the contact detent plate 6. Thus, the turning of the key is such that normal starting up and stopping is available. As is usual with igntion locks, the key cannot be removed when turned to the runnning or start position.

If undue pressure is applied to the lock barrel 1, for instance by the use of an instrument or the incorrect key, the lock sleeve 2 and spindle extensions 1a, 1b will move axially from the position shown in FIGURE 1 to the position in which the ball catch 4a is received in a circumferential groove 2d. In this position the cam dog 8 is disengaged from the latch cam C and the moving contact plate 9 is away from the fixed contacts 9a. The locating key 2c of the sleeve 2 is free to turn in an annular recess 4d in the sleeve 4. Thus, the vehicle is immobilized and as the barrel is rotatable, it cannot be drilled out or picked.

Referring now to the function of the bolt 15, this is arranged so that the operation of switching off the engine alone will not lock the steering shaft, and also so that the engine cannot be started up with the steering locked. The bolt 15 is mounted within a bolt sleeve 18, this being urged inwardly with respect to the housing 3 by a spring 19. A controlling sleeve 20 is provided around the sleeve 18, this sleeve 20 having an associated spring 21 and the sleeves 18, 20 and their springs are held by a register lug 22. This lug 22 locates the assembly on the outer casing 14 and also can be turned thus to apply torsion to the spring 21, which in turn, loads the sleeve 20.

The cam C operates on a plunger member 23 which bears on the sleeve 18 and through a spring 24, on the inner end of the bolt 15. A pin 25 is provided extending radially from this end of the bolt, which pin passes out through slots through the sleeves. A control lever 26 is provided secured to the sleeve 20, this extending through a part-circumferential slot through the body extension 3a. The arrangement is such that the cam C when the lock key is in the off position will load the bolt 15, but owing to the position of the sleeve and pin 25 and slot, the bolt cannot move to lock the steering shaft unless the lever 26 is moved, after the key has been turned to the off position. When the key is turned to switch on, from the off and locked position, cam pressure is removed from the plunger member 23, and the sleeve 18 will move inwardly (i.e. towards the housing 3) by virtue of the pressure of its spring 19. When the pin 25 passes the shoulder of the slot 20a (FIGURE 3) through the sleeve 20, this sleeve will turn under the influence of its torsion spring. This, by virtue of the pin and slots, results in the locking of the bolt in the retracted position, and when this condition is obtained, the steering cannot be locked by key movement alone, nor by movement of the lever 26. Assuming the key is turned to switch off, then the bolt 15 is held by the pin and slot arrangement, the spring 24 being loaded, although the sleeve 18 moves outwardly. The electrical circuits are broken, but the steering is not locked until the lever 26 is moved to bring the sleeve into a position such that the pin is clear and the bolt 15 moves under the pressure of the spring 24, so that its outer end engages in the split collar.

On switching off, the cam C engages the plunger member 23 and primes the bolt, which, however, is held by the sleeve 20 through the pin 25. The cam is held so as to be just not in the full off position, so that the key cannot be withdrawn. By the second operation of moving the lever 26 to turn the sleeve 20 the bolt is freed, so moving to lock the steering and also the key can be turned to the fully off position and withdrawn.

Should the lock 1 be moved axially into the contact-broken and inoperative position, it can be re-set by inserting the correct key and pulling outwardly until the locating key 2c on the sleeve 2 drops into its corresponding keyway in the body 3.

Should the barrel 1 be forced in, the sleeve 2 will also move in, and the ball of the catch 4a will drop into the groove 2d. The barrel and sleeve will now turn together so that the contacts are broken and the lock cannot be operated except with the correct key. The lock is re-set for operation by inserting the correct key into the barrel and turning, the plate 5 turning therewith, so that by engagement of an abutment of the lug or flange 5a, the barrel and sleeve line up. The key is turned to the start or running position, when it cannot be withdrawn, so that now the key, barrel and sleeve 2 can be pulled forwardly, with the key 2c aligning with its keyway.

This situation is obtained because in the upset position the pressure of the ball 2a in the recess 2d produces sufficient frictional drag for the barrel 1 to be turned clockwise in the sleeve 2 until an abutment of the lug 5a meets the projection 2b. Continued turning will bring the lock, key and barrel into the start position when the projection 2c aligns with its keyway in the body 3. As the lock tumblers are withdrawn the lock key is retained and can be used to pull the barrel outwardly.

When the lock is upset, the dog 8 has moved axially out of the cam C, which is held by the indent plate 6. Thus, in this position, the barrel and its associated parts can rotate freely but the cam C does not rotate and holds the bolt in the locking or primed position, whilst the sets of electric contacts are held apart.

As mentioned above, the cam C and dog 8 have complementary teeth and recesses such that they engage only in one relative position, i.e. when the lock key is turned to the off position. The key must therefore be turned to the off position before the engine can be started, this action resulting also in the engagement of the dog with the cam, so that if the key is now turned to the start position, the appropriate electrical circuits are made and the bolt 15 is withdrawn from the slot 17.

The key is now turned to the off position so that the dog and cam re-align. The lock is now ready for normal operation. Should the barrel 1 be pushed in whilst the lock is in the off position, then the contacts cannot make whilst the steering is locked because the dog 8 will not enter its recess in the cam until the key is again turned to the off position. It is therefore, impossible to switch on with the steering locked.

Thus, with the device according to the invention, it is impossible to use the vehicle under any circumstances by attempting to free the lock. Further, if the lock has been tampered with so as to immobilise the operation of the device, same cannot be re-set to start up the engine unless the steering is unlocked. With manipulation by the correct key, starting from the fully immobilized position, the electrical circuits cannot be made until the steering bolt 15 has been released, and from the mobilised position, the action of switching off the electrical circuits alone does not result in the locking of the steering.

I claim:

1. Locking and immobilizing means for automobiles having a steering column and steering shaft, comprising a key operated lock including a barrel, a housing for said lock, an inner sleeve mounted in said housing for rotational and axial movement relative thereto, said lock barrel being mounted in said inner sleeve for rotational movement therewith and relative thereto, an outer sleeve fixedly secured in said housing, said inner sleeve being mounted in said outer sleeve for rotational and axial movement relative thereto, catch means in said outer sleeve and engaging said inner sleeve for constraining said lock and inner sleeve against axial movement relative to said outer sleeve in the normal operating position of said lock, means mounting said catch means whereby the constraint of said catch means is overcome by undue pressure on the lock face so that the lock and inner sleeve move axially inwardly to an upset position, said catch means including a catch for retaining said lock and inner sleeve in the upset position until reset for re-setting by the lock key, an extension from the rear of the lock barrel, one set of electric contacts carried by said extension, a fixed set of contacts carried by said housing for cooperation with said one set of contacts in normal operation of said lock, a cam rotatable on and axially movable relative to said extension, a spring loaded bolt in said housing and engageable by said cam, means for mounting said housing on said steering column, means supporting said bolt in said housing for axial movement thereof whereby said bolt is loaded by said spring when the key lock is turned to the off position, rotation of said key, and therefore of said barrel, causes rotation of said cam and hence loading of said bolt, and a manually operable lever in said housing and movable to a plurality of positions and including means actuated thereby whereby said bolt is held in a loaded retracted condition in one of said positions and wherein movement of said lever to the other of said positions releases said bolt into locking engagement with said steering shaft.

2. Locking means as claimed in claim 1, said means for mounting said housing on the steering column comprising a lateral extension of the housing for mounting on the steering column, with said bolt slidably mounted in said extension, a spring loaded sleeve assembly for said bolt and having slots therethrough, said manually operable lever including means actuated thereby comprising a pin projecting from the extension to engage in said slots, said manually operated lever permitting a sleeve of the assembly to be turned to release the bolt to the locking position after key lock operation to the "off" position, key lock operation from the off position turning said cam to retract the bolt.

3. Locking means a claimed in claim 2, said sleeve assembly comprising inner and outer concentric sleeves, the inner sleeve being moved axially against spring pressure by the cam, torsional spring loading means for said outer sleeve, said slots comprising a stepped aperture in said outer sleeve and said pin engaging said stepped aperture, said pin in normal operation holding the said bolt against spring loading, said manually operable means permitting turning of the outer sleeve to free the pin and permit the bolt to move to its locking position, the release pressure of the cam on key operation freeing the bolt, the inner sleeve being spring pressed to the cam so that said sleeve and bolt move to the unlocked position.

4. Locking and immobilizing device for motor road vehicles, said device comprising a housing, an outer sleeve secured in said housing at its front end, an inner sleeve rotatably and axially movably mounted within said outer sleeve, a key operated lock rotatably mounted and axially fixed in said inner sleeve, a catch means between the inner and outer sleeves normally to retain the inner sleeve and lock in position as a unit against axial displacement and for normal operation by a key, cooperating locking means between the inner and outer sleeves to lock the inner sleeve against turning movement in the normal position of use, an extension on the rear of the lock to operate sets of electric contacts for normal operation, said catch means being released on application of excessive force on the lock face so that the lock and inner sleeve move as a unit axially rearwardly into an upset position, said catch means also including a catch for retaining the said lock and inner sleeve in the upset position in which the sets of electric contacts are held apart, and the inner sleeve can turn in the outer sleeve, and indexing means between the lock and inner sleeve whereby the said lock and inner sleeve can be turned relatively by the lock key into a reset position, in which the locking means between the inner and outer sleeves are re-engaged by pulling the key and lock forwardly.

5. Locking device as claimed in claim 4, wherein the catch means comprise a spring loaded ball in the outer sleeve, a recess in the inner sleeve to receive said ball in the normal position, and wherein said catch comprises a groove around said inner sleeve to receive the ball in the upset position.

6. Locking device as claimed in claim 4, wherein the extension comprises a spindle with a plate carrying one of the sets of electric contacts, a second of said sets of contacts being mounted in the housing.

7. Locking device as claimed in claim 4, comprising a yoke member on the housing for securing same to the steering column of the vehicle, a bolt member in said housing, a cam on said extension, said extension slidably and rotatably mounted in said cam and said cam rotatable therewith on normal operation of the lock, means driven by said cam and loading said bolt for outward movement from the housing for locking engagement with the steering shaft when the lock key is turned to the off position, said cam driven means including a spring.

8. Locking device as claimed in claim 7, wherein said extension carries a dog which turns and is slidable therewith, said dog and said cam having complementary teeth and recesses which engage only in one relative position whereby said cam is driven by said dog and whereby said dog moves away from the cam when the lock is upset, in which position said extension turns relative to said cam.

9. Locking device as claimed in claim 8, wherein the bolt is held in the loaded position for release to lock the steering column, including a manually operated lever movable in a plurality of positions, and means actuated by said lever, whereby when said lever is in one of said positions said means restrains said bolt and when said lever is in another of said positions, said means releases said bolt to lock said steering column against movement thereof.

References Cited
UNITED STATES PATENTS

| 1,342,728 | 6/1920 | Welch | 70—252 |
| 2,148,609 | 2/1939 | Edwards | 70—252 |
| 2,221,082 | 11/1940 | Fitzgerald | 70—252 |

A. HARRY LEVY, *Primary Examiner.*

U.S. Cl. X.R.

180—114; 200—61.54, 61.64